Figure 1:
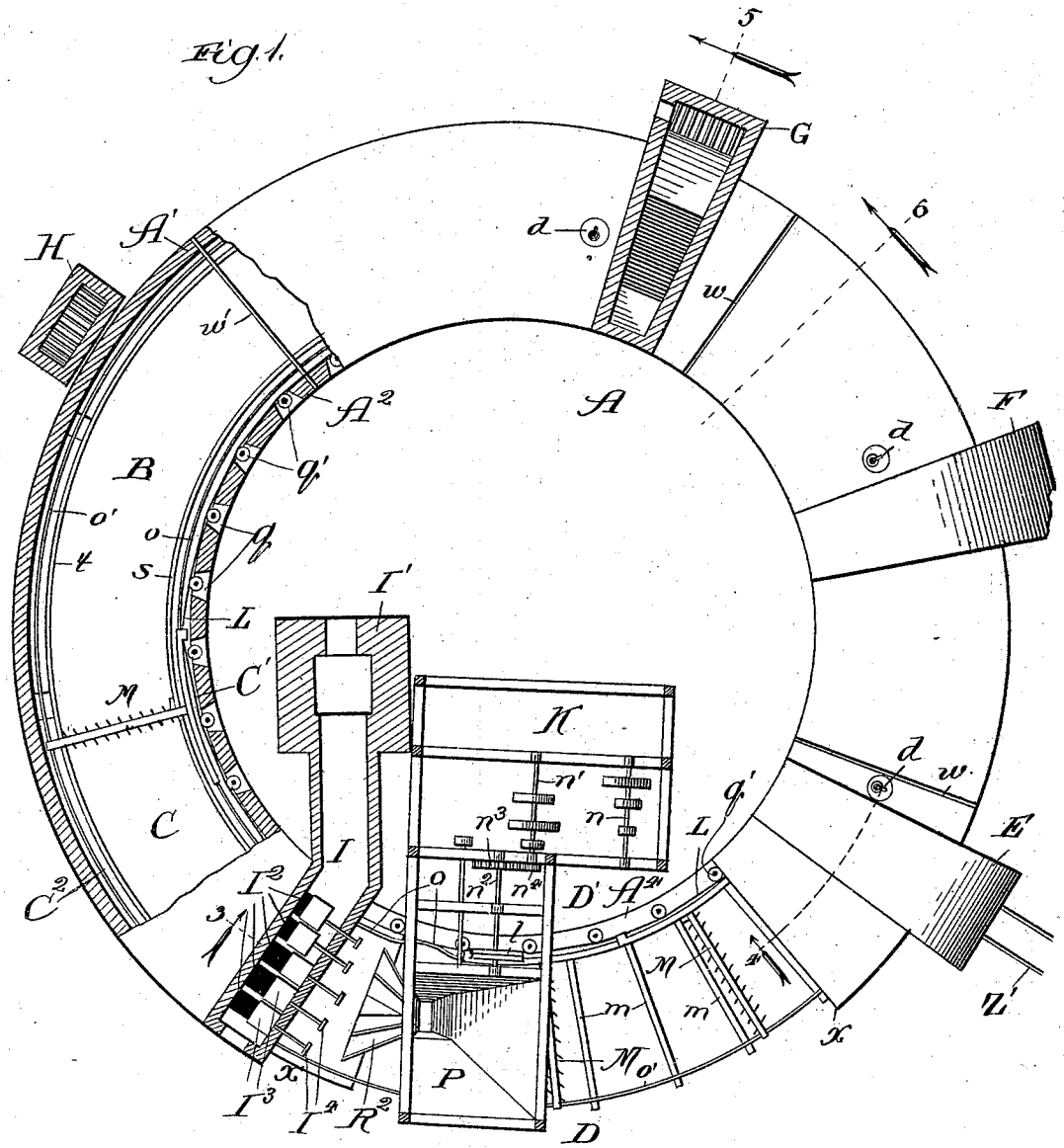

(No Model.) 6 Sheets—Sheet 1.

H. F. BROWN.
ORE ROASTING FURNACE.

No. 519,317. Patented May 8, 1894.

Witnesses:
Chas. E. Taylor,
C. J. Timmerman.

Inventor:
Horace F. Brown,
By Dyrenforth & Dyrenforth,
Attys.

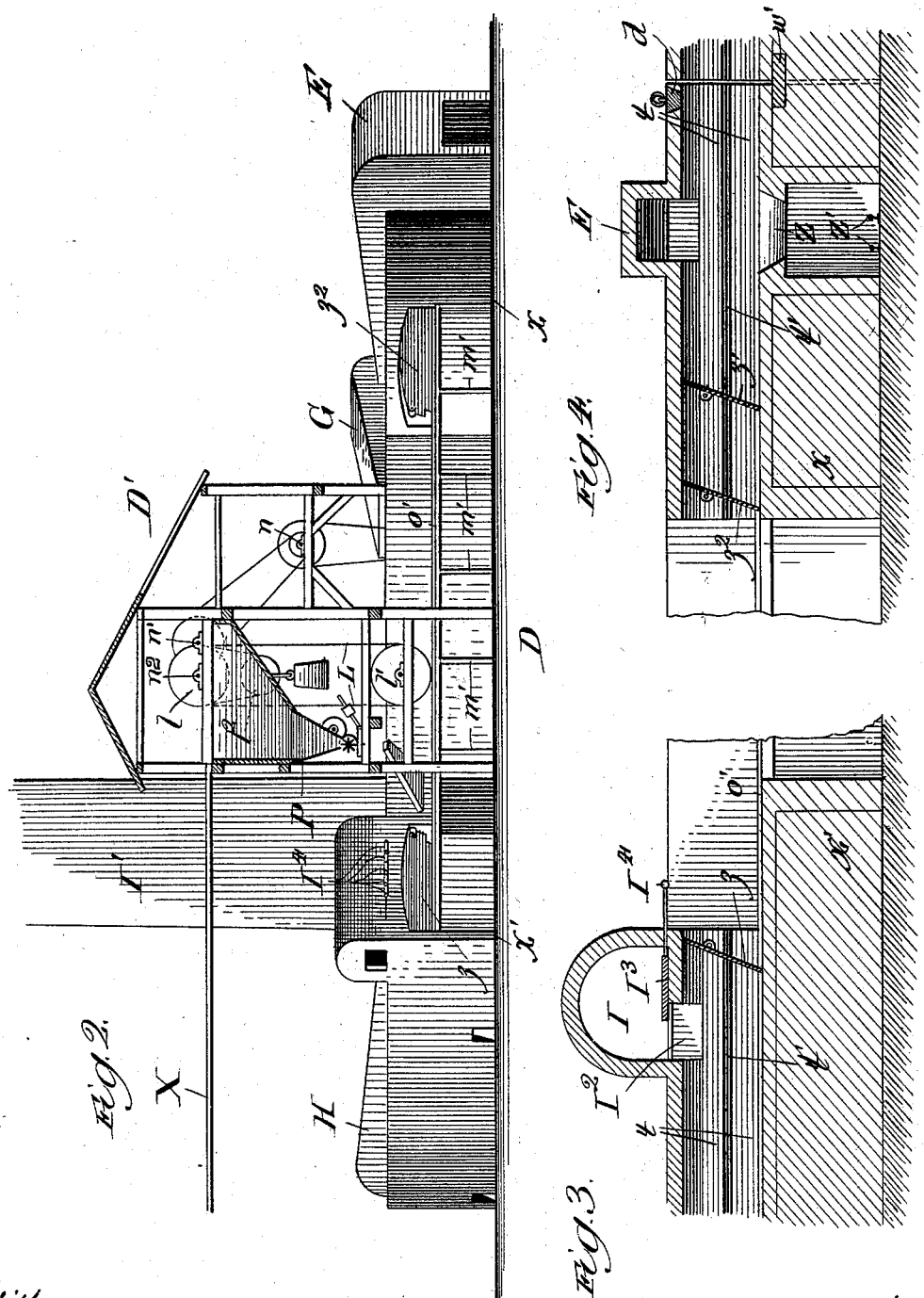

(No Model.) 6 Sheets—Sheet 3.
H. F. BROWN.
ORE ROASTING FURNACE.
No. 519,317. Patented May 8, 1894.
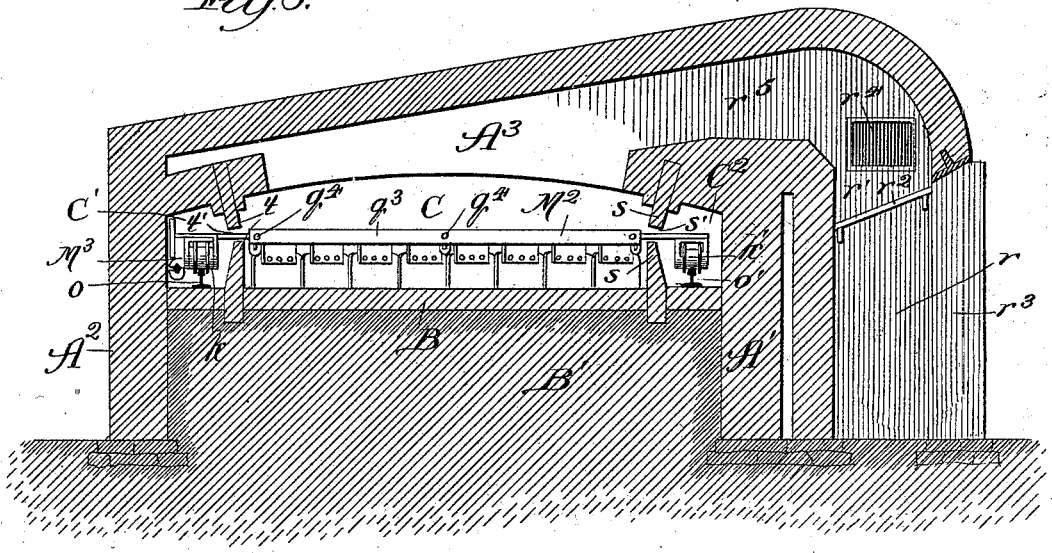
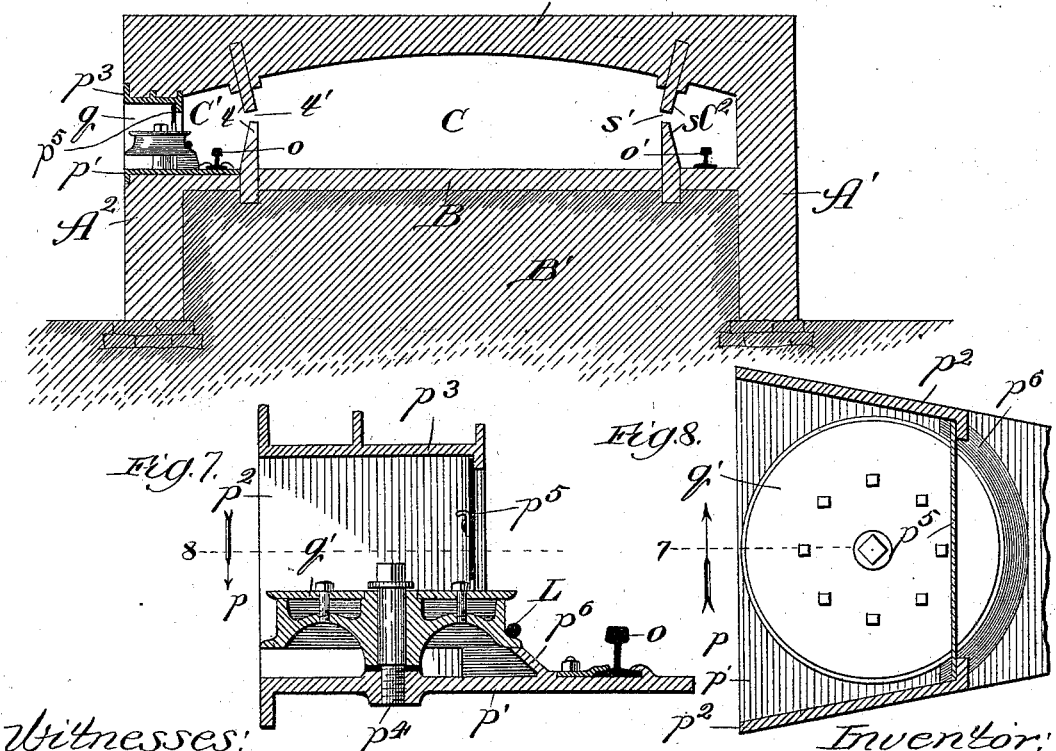
Witnesses:
Chas. E. Gaylord
O. J. Timmerman
Inventor:
Horace F. Brown,
By Dyrenforth & Dyrenforth
Attys.

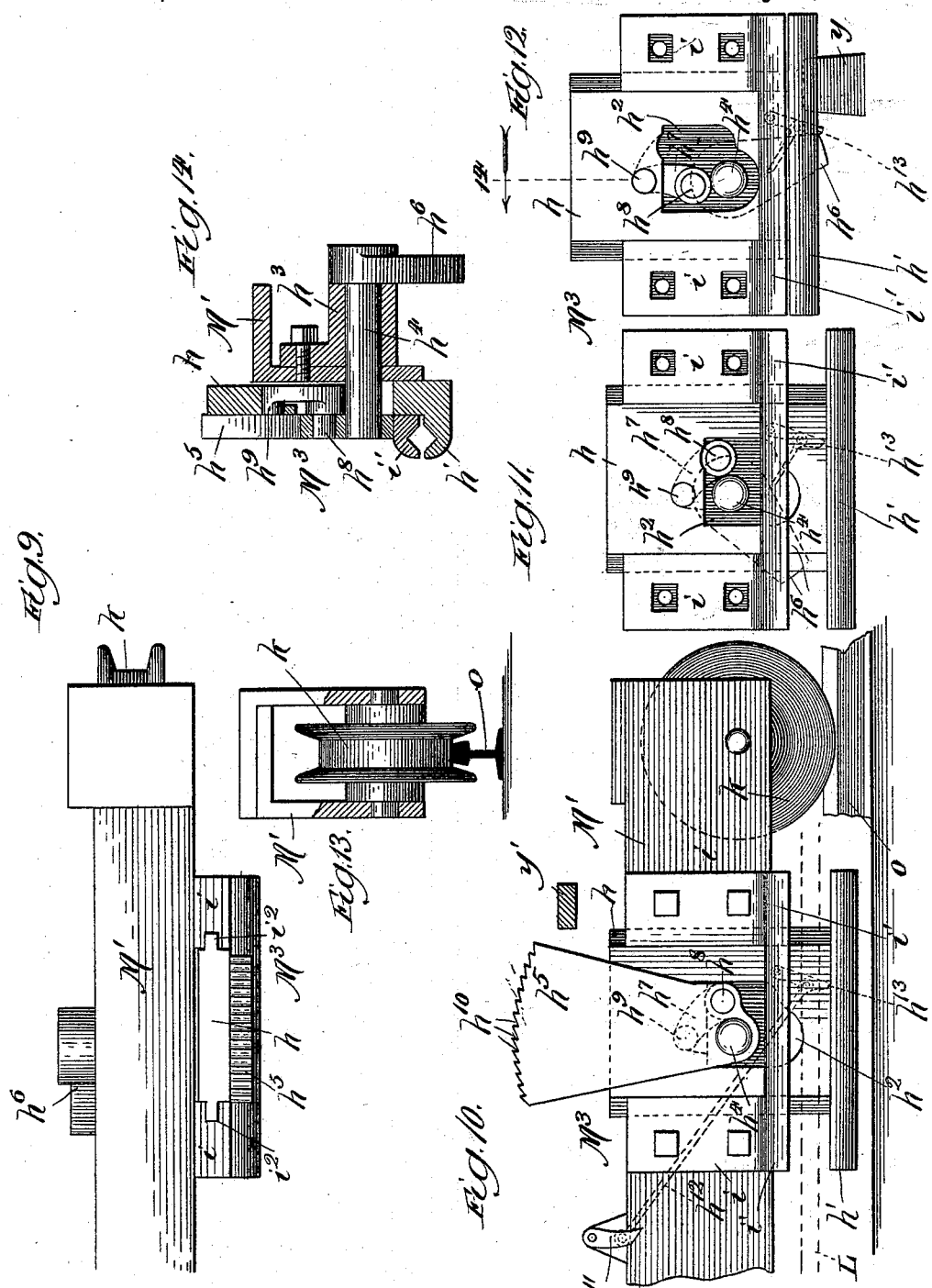

(No Model.) 6 Sheets—Sheet 5.
H. F. BROWN.
ORE ROASTING FURNACE.
No. 519,317. Patented May 8, 1894.
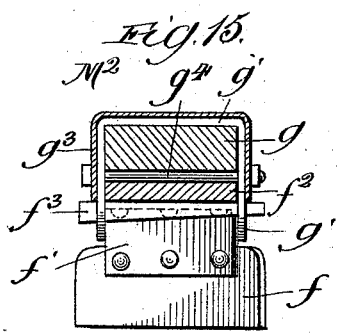
Fig. 15.
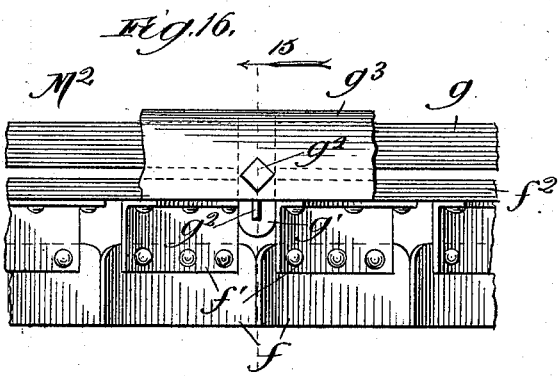
Fig. 16.
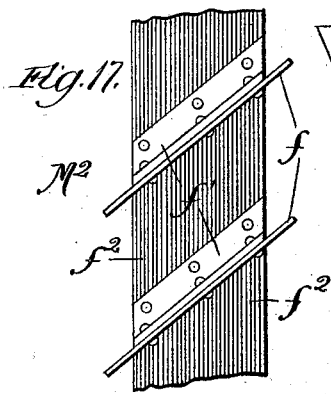
Fig. 17.
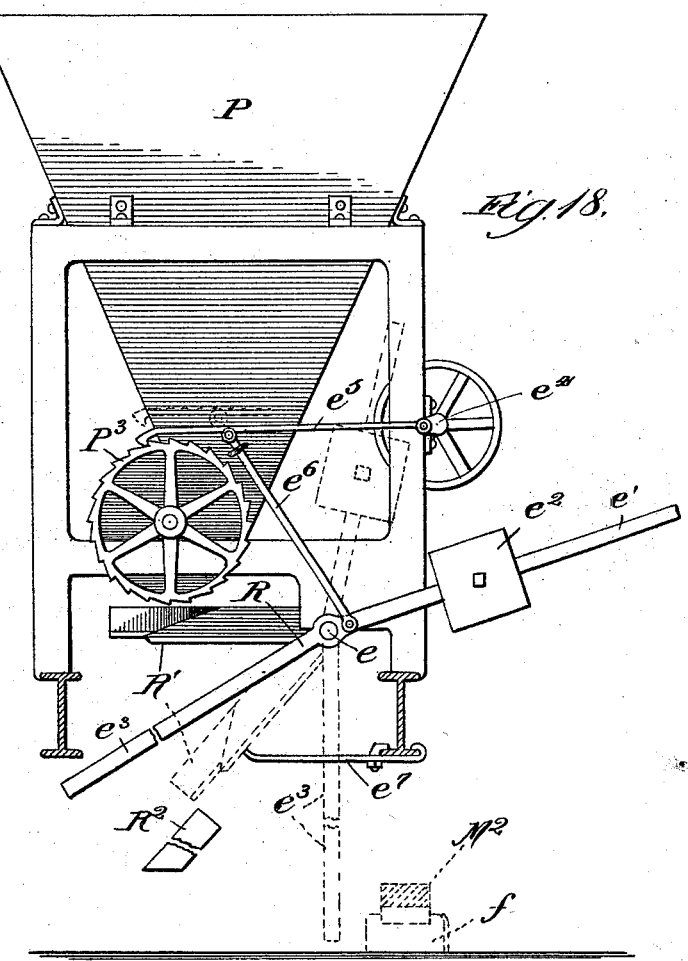
Fig. 18.
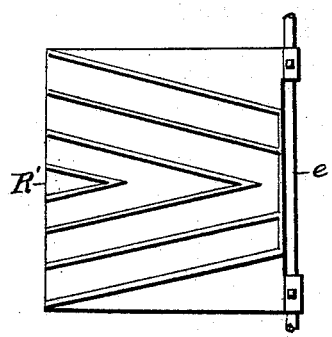
Fig. 18ª.
Witnesses:
Chas E Gaylord
E. G. Timmerman.
Inventor:
Horace F. Brown,
By Dyrenforth & Dyrenforth,
Attys.
THE NATIONAL LITHOGRAPHING COMPANY,
WASHINGTON, D. C.

(No Model.) 6 Sheets—Sheet 6.

H. F. BROWN.
ORE ROASTING FURNACE.

No. 519,317. Patented May 8, 1894.

Witnesses:
Chas. E. Gaylord
C. G. Timmerman

Inventor:
Horace F. Brown,
By Dyrenforth & Dyrenforth
Attys.

THE NATIONAL LITHOGRAPHING COMPANY,
WASHINGTON, D. C.

UNITED STATES PATENT OFFICE.

HORACE F. BROWN, OF CHICAGO, ILLINOIS.

ORE-ROASTING FURNACE.

SPECIFICATION forming part of Letters Patent No. 519,317, dated May 8, 1894.

Application filed June 24, 1893. Serial No. 478,695. (No model.)

*To all whom it may concern:*

Be it known that I, HORACE F. BROWN, a citizen of the United States, residing at Chicago, in the county of Cook and State of Illinois, have invented a new and useful Improvement in Ore-Roasting Furnaces, of which the following is a specification.

My invention relates to various improvements in reverberatory ore-roasting furnaces, especially applicable to curved furnaces, as furnaces of annular or horse-shoe shape; and in my present application all of my improvements are shown in connection with a furnace of this character, though some of the features will be found desirable with furnaces of other forms.

Generally stated my furnace, as illustrated, operates in the following manner: An ore-roasting chamber, in the form of an arc of a circle, with an open space completing the circle, is provided at intervals with reinforcing furnaces which communicate by way of the ore-roasting chamber with a chimney. The ore roasting chamber is provided with stirrers upon arms operated by means of carriers outside the roasting chamber proper, substantially after the manner shown in Letters Patent of the United States No. 471,264, granted to me on the 22d day of March, 1892; that is to say, the arm which carries the stirrers extend through a longitudinal slot in the wall of the roasting chamber, whereby all the impelling mechanism is removed from the direct action of the hot products of combustion, and is thus protected against injury by the heat. The impelling mechanism for the stirrers is in the form of carriers operated automatically from a continuous cable traveling upon sheaves adjacent to the carriers, the construction being such that each carrier comes to rest upon reaching the open space above mentioned. In this open space each carrier is advanced at intervals by the impact of the one immediately following so that by the time a carrier and its attendant parts again enter the roasting chamber it has had sufficient time to cool, and to receive any attention in the way of repair that it may require. Just before re-entering the roasting chamber, the carrier automatically grips the cable and is carried forward continuously and at uniform speed until it strikes the rearmost carrier in the open space, advancing all the carriers at rest one step, and coming to rest itself through the action of automatic mechanism which releases its grip upon the cable. The carriers travel in a direction contrary to that of the products of combustion which has advantages though the directions may be the same if desired. The ore is fed upon the hearth of the roasting chamber at the entrance of the latter and is advanced intermittingly by the action of the stirrers to the terminus of the hearth where it is discharged.

One of the features of my present invention relates to automatic feeding mechanism by which the ore is deposited at proper intervals and in regulated quantities upon the hearth and spread uniformly upon the latter to be acted upon by the stirrers.

The foregoing will suffice to convey a general comprehension of the nature and objects of my invention, and will serve as an aid in understanding the description of the specific construction by which the desired results are produced.

All the various mechanisms are illustrated in detail in the accompanying drawings, in which—

Figure 19:
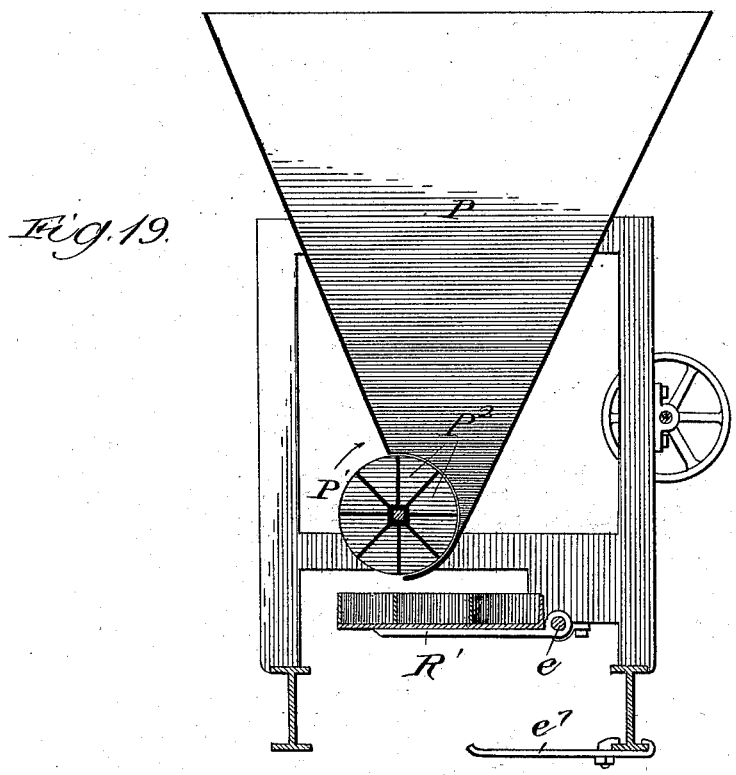

Figure 1 is a broken sectional plan-view, partly diagrammatic, of the roasting chamber, furnaces and other details of the structure; Fig. 2, a broken view in side elevation of the plant, on a reduced scale; Figs. 3, 4, 5 and 6, enlarged sections taken respectively on lines 3, 4, 5 and 6 of Fig. 1, and viewed as indicated by the arrows; Fig. 7, a section taken on line 7 of Fig. 8, showing one of a series of similar openings, in the inner circular wall of the structure, which contain the cable guiding and supporting sheaves; Fig. 8 a section taken on line 8 of Fig. 7; Fig. 9, an enlarged broken top plan view of the forward or gripping-end portion of one of the stirrer arm carriers; Fig. 10, a side elevation of the part shown in Fig. 9, with the cable gripping jaws opened; Fig. 11, a view of the same gripping mechanism with parts removed to disclose features which would otherwise be hidden; Fig. 12, a view similar to Fig. 11, but showing the gripping jaws closed; Fig. 13, a broken partly sectional view of the end of the part shown in Figs. 9 and 10; Fig. 14, a cross section of the gripping mechanism taken on line 14 of Fig. 12; Fig. 15, a section taken on line 15 of Fig. 16; Fig. 16, a broken side view of one of the stirrer arms; Fig. 17, a broken view of the underside of a stirrer arm; Fig. 18, a side elevation of the ore-feeding mechanism; and Fig. 18$^a$, a broken plan view of a detail thereof; Fig. 19, a vertical section of the same; and Fig. 20, a broken plan sectional view of the structure, taken at the open space between the ore-receiving and discharging ends of the roasting chamber.

The furnace structure A is formed with an outer circular wall A′, an inner wall A², concentric with the wall A′, a hearth B, which may be upon a bed B′, and a roof A³, arched on its under side.

C is the roasting chamber, flanked on opposite sides by chambers C′ C², from which it is separated by longitudinally slotted walls or partitions $t\ s$. The roasting chamber extends from $x$, in Figs. 1 and 2, around an almost complete circle to $x'$, in the same figures, and the break between the points $x\ x'$ is an open portion of the structure forming a cooling space, D, through which access may be had to the circular space inclosed by the wall A′.

E, F, G and H are furnaces, located at intervals, as indicated, around the outer wall A′. Each furnace may be constructed as shown in Fig. 5, with an ash-pit $r$ and combustion chamber $r'$ divided from each other by an inclined grate $r^2$; the ash-pit having a draft and cleaning opening $r^3$ and the combustion-chamber a fuel feed opening $r^4$. Each fire-chamber has a flue $r^5$ leading to the roasting chamber C through the roof of the latter. The initial furnace E, is adjacent to the end $x$ of the roasting chamber; and near the end $x'$ of the roasting chamber is a flue I which extends across the upper side thereof to a chimney I′. Between the roasting chamber and flue I is a series of openings I² provided with dampers I³ having operating rods I⁴ extending to the outside of the structure. The hot products of combustion from the furnace E pass around, through the roasting chamber, to the flue I and chimney, being reinforced on the way by the hot products of combustion from the furnaces F, G and H, respectively.

Extending at short intervals through the wall A², at the hearth B, is a series of openings $q$ into which are fitted boxes $p$. Each box $p$ (see Figs. 7 and 8) is formed with a base-plate $p'$, side plates $p^2$ and top-plate $p^3$, and is firmly incased in the wall. Fastened to the base plate $p'$ of each box is a vertical pin $p^4$ upon which a guide-wheel $q'$ preferably in the form of a sheave is mounted to rotate in the horizontal plane. The sheaves $q'$ project a short distance into the chamber C′, and the base plates $p'$ extend across or nearly across the chamber C′ to the partition $t$. At the inner side of the box is a removable back plate $p^5$ which extends from the top plate down nearly to the sheave. The base plates are constructed to afford rail-chairs on which is mounted a continuous track rail $o$. Extending around the partition $s$ in the chamber C² is a continuous rail $o'$.

Figure 20:
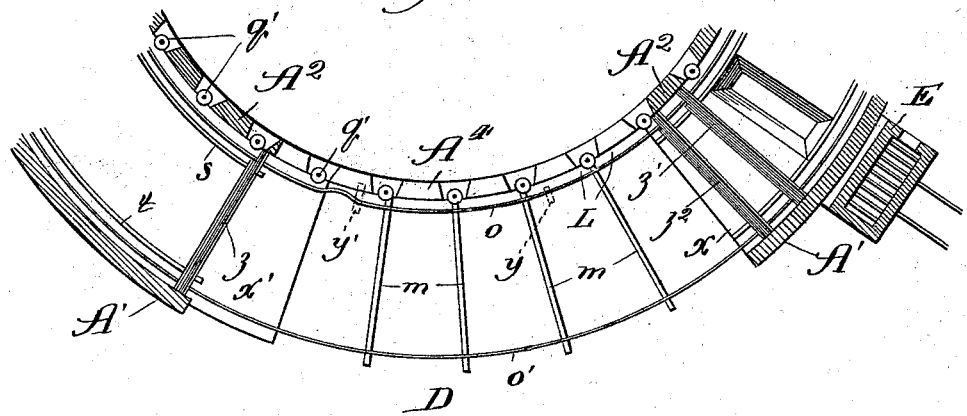

At the break or open space D is a frame work D′, which may or may not be inclosed, and which supports the ore feeding mechanism hereinafter described. In the space inclosed by the furnace structure is an engine indicated at K, from which the various moving parts of the construction are operated. Journaled in the frame work D′ are a drive-shaft $n$, which is belted to the engine, not shown, a shaft $n'$, belted to the shaft $n$, and a shaft $n^2$ carrying a gear wheel $n^3$ driven by a pinion $n^4$ on the shaft $n'$. A wall A⁴ forming the continuation of the wall A² extends, to the height of the plane of the openings $q$, across the break D, and supports sheaves $q'$, as indicated in Figs. 1 and 20, which complete the circle described by the series of sheaves. The wall A⁴ also supports the rail $o$ where the latter extends across the break. Forming part of the frame work D′ are beams $m$, resting at their inner ends on the wall A⁴, and supported at their outer ends upon posts $m'$. The beams $m$ support the track $o'$ where it extends across the break D.

L is an endless cable which extends around the wall A², in the chamber C′, against the sheaves $q'$. The shaft $n^2$ in the frame work carries a drum $l$, and below and parallel with the shaft $n^2$ is a shaft carrying a drum $l'$, which extends at the lowest part of its circumference in the plane of the sheaves $q'$. From the sheaves $q'$ at one side of the drum $l'$, the cable passes, as indicated in Fig. 2, under the drum $l'$ to and over the drum $l$, thence under a weighted pulley $l^2$ back to and over the drum $l$, and thence down to and under the drum $l'$ to the sheave $q'$ at the opposite side. The weighted pulley $l^2$ is suspended from the cable and thus operates as a tightener for the latter.

M M are the stirrer carrier frames, which are of T-shape, each comprising a head-bar M′ and an arm M². The head-bar M′, may be L-shaped in cross-section and curved longitudinally to conform approximately to the circle described by the track-rail $o$. It is provided at opposite ends with grooved wheels $k$ which travel upon the rail $o$. The partitions $t\ s$ are separated by longitudinal slots $t'\ s'$ just large enough to permit the arms M², which extend from the chamber C′ across the roasting chamber to the chamber C², to move without obstruction from the partitions. At the ends of the arms M² are grooved wheels $k'$ which travel upon the track $o'$.

Near the forward end of each head-bar M′ is cable gripping mechanism M³. The gripping mechanism comprises a fixed part, formed with two side-plates $i\ i$ secured to the side of the bar M′ and a cross plate or bar $i'$ which affords the upper gripping jaw, and a movable part comprising a plate $h$ which slides in vertical guide grooves $i^2$ in the plates $i$, and has a flange $h'$ at its lower edge affording the lower gripping jaw. Through the plate $h$ is an opening $h^2$ of the form shown partly by dotted lines in Figs. 10 and 11, and by full lines in Fig. 12. On the bar $M'$ is a bearing $h^3$ for a short horizontal rock-shaft $h^4$. The shaft $h^4$ extends through the opening $h^2$ in the plate $h$, and carries, adjacent to the plate $h$, an upward extending switch finger $h^5$, and, at the opposite side of the bar $M'$, a downward extending switch-finger $h^6$. In the opening $h^2$ is the link $h^7$ pivotally connected at one end to the finger $h^5$ at $h^8$, and pivotally connected at its opposite end to the plate $h$ at $h^9$. In the open space D near the end $x$ of the roasting chamber is the stop $y$ in the path, when the gripping jaws are closed, of the switch-finger $h^6$; and in the open space D near the end $x'$ of the roasting-chamber is a stop $y'$, in the path, when the gripping-jaws are open, of the switch-finger $h^5$. In the movement of a stirrer frame M, as hereinafter described, when it enters the open space D, its switch finger $h^6$ strikes the stop $y$, causing the shaft $h^4$ to rock, to turn the switch-finger $h^5$ to the raised position shown in Fig. 10, and draw down the link $h^7$ and plate $h$ to open the gripping jaws; and in the further progressive movement of the stirrer frame toward the end $x'$ of the roasting chamber, as hereinafter described, the switch finger $h^5$ strikes the stop $y'$, turns the rock-shaft $h^4$ and finger $h^6$ to the positions shown in Figs. 11, 12 and 14, forcing up the link $h^7$ and plate $h$ to close the jaws $h' i'$. The jaws of the gripping mechanism are in position to engage the cable as they close, and in opening they release the cable.

The switch-finger $h^5$ is provided on its upper end with teeth $h^{10}$ which are engaged by a pawl $h^{11}$ pivoted on the head $M'$, the effect of which is to insure the holding of the switch finger and attendant mechanism in gripping position after it has been acted upon by the stop $y'$. Just before reaching the stop $y$ the pawl is released through the medium of the rod $h^{12}$ which is tripped by impact with the stop $y$, thus permitting the parts to be thrown out of gripping position when the finger $h^6$ comes into contact with the stop $y$. For this purpose the rod $h^{12}$ is pivotally connected to the pawl $h^{11}$ and projects obliquely downward to a point slightly in advance of the finger $h^6$ where it is pivotally connected to a wiper $h^{13}$ pivoted on the fixed jaw $i'$. Thus when the wiper comes into contact with the stop $y$ the pawl $h^{11}$ is lifted out of engagement with the teeth, and it drops back to its normal position when the stop has been passed.

The arm $M^2$, of each stirrer frame, comprises a bar $g$ which is fastened at one end to the bar $M'$, preferably midway of the length of the latter, extending therefrom at a right angle, to the track $o'$ upon which its wheel $k'$ travels as before stated. In the annular space between the circles described by the partitions $t s$, the bar $g$ is provided with, say, three clips $g'$ which extend across the top and down the sides of the bar, and are formed below the plane of the under side of the bar with key openings $g^2$. Extending over the bar $g$ and clips $g'$ is a shield $g^3$, held in place by bolts $g^4$ which pass across the under side of the bar $g$. The stirrer blades $f$ are fastened to angle-iron braces $f'$ secured to the under-surface of a bar $f^2$. The stirrer blades extend parallel with each other and obliquely with relation to the bar $f^2$. The bar $f^2$ fits, between the sides of the clips, against the cross-bolts $g^4$, and is held firmly in place by keys $f^3$ driven across its under surface through the key-openings $g^2$.

The ore to be roasted may be conveyed to the furnace in dumping cars (not shown) traveling upon a track X, above the furnace, and which enters the frame-work D'. Below the dumping position of the cars is a hopper P. The lower end of the hopper is closed by a wheel P' mounted upon journals in the frame-work to rotate in the vertical plane, and provided lengthwise with radial partitions affording segmental pockets $P^2$, open at the circumference and closed at the ends. Around the wheel at one end is a ratchet $P^3$. Below the wheel P' and pivoted upon a shaft $e$ is a dumping lever R, one arm of which, $e'$, carries an adjustable weight, $e^2$, the other arm $e^3$ being free. Integral with the lever R is a fan-shaped platform R', held by the counterweight $e^2$ normally in the horizontal plane across the under side of the wheel P'. Rotating in the frame-work is a shaft carrying a crank $e^4$, and pivoted at one end to the crank is a pawl $e^5$, which at its free end engages a tooth of the ratchet $P^3$. Pivoted at one end to the arm $e'$ of the lever and at its opposite end to the pawl $e^5$ is a link $e^6$. The lever R swings from the position shown by full lines in Fig. 18, wherein the platform R' extends across the underside of the wheel P' and the pawl $e^5$ engages the ratchet $P^3$, to the position indicated by dotted lines, wherein the platform R' rests against a stop $e^7$ on the frame-work, the pawl is out of engagement with the ratchet, and the arm $e^3$ extends downward into the path of the stirrer arms $M^2$.

In operation the ore to be roasted is dumped into the hopper P and fills those pockets $P^2$ of the wheel P' which at the time register with the discharge end of the hopper. The crank $e^4$ rotates continuously and causes the pawl with each revolution to reciprocate and move the wheel around the distance of one tooth of the ratchet $P^3$. As a pocket passes across the hopper it is filled with ore which as the pocket leaves the hopper is dumped upon the platform R'. When sufficient ore has been deposited upon the platform to overcome the weight $e^2$, the lever upsets, and the ore is discharged from the platform R' upon a stationary inclined platform $R^2$ which terminates over the hearth near the end $x'$ of the roasting chamber just above the path of the stirrer arms. The lateral edges of the platform R' diverge whereby it is widest at the discharge end, and on the surface of the platform are ribs forming the said surface into a series of radially diverging chutes which spread the ore as it runs therefrom over the platform R². The latter platform is also formed with diverging chutes causing the ore to be distributed uniformly across the hearth. When the lever R is upset as described, the pawl $e^5$ is raised, through the medium of the link $e^6$, and the wheel P' remains stationary. The weight $e^2$ is swung to a point above the fulcrum of the lever whereby the latter remains balanced in its upset position with its arm $e^3$ extending into the path of the stirrer arms as before described. In the movement of a stirrer arm below the lever, it impinges against the arm $e^3$ and turns the lever until the weight $e^2$ overbalances the latter and swings the platform R' to the horizontal plane, and the pawl into engagement with the ratchet P³. By adjusting the weight $e^2$ upon the lever, the quantity of ore discharged upon the hearth with each operation may be regulated, and the frequency of the charges may be regulated by timing the travel of the stirrer arms, as hereinafter described.

The cable travels continuously, and two, four, six or more stirrer carrier frames may be employed, as desired. The stirrer blades are set obliquely to their direction of travel, the blades of alternate, that is to say, of every second one of the carriers pointing in the direction of the partition $t$ and the blades of the intervening carriers toward the partition $s$, this arrangement being usual in furnaces of this character. At the end $x'$ of the roasting chamber is a vertically swinging self-closing door $z$, and between the fire box E and end $x$ are two similar doors $z'$ $z^2$. When a stirrer frame grips the cable it strikes against and opens the door $z$, (which closes when released) and moves into the furnace, carrying in the ore deposited upon the hearth by the feed. In Fig. 1, two stirrers are shown at rest in the open space D, one just released from the cable and the other ready to engage the latter. When a stirrer frame advances from the end $x$ it strikes the rearmost stirrer in the open space, and advances it and the foremost stirrer until the latter grips the cable and advances into the furnace. In practice the stirrers may follow each other say one minute apart, causing the feed mechanism to deposit ore upon the hearth at intervals of a minute, and each stirrer to remain in the open space two minutes to cool. The time may of course be varied as desired. The construction of the stirrer arms gives an air-space around the bar $g$ except at the points where the clips $g'$ and bolts $g^4$ intervene, the bar $g$ is thus protected from the heat of the roasting chamber, and as the shield $g^3$ is cooled off regularly at the open space, as described, the stirrer-arms will last an indefinite time. In the event that any of the stirrer blades become seriously injured by the heat of the roasting-chamber or contact with the ore, the bar $f^2$ carrying the blades may be quickly removed, when the stirrer reaches the open space, by knocking out the keys $f^3$, and replaced by another bar $f^2$ without stopping the operation of the stirring mechanisms. The partitions $t$ $s$ serve to shield the chambers C' C² from the hot products of combustion, and to protect the cable, track-rails and end portions of the stirrer carrier-frames from the heat. The cable tensioning mechanism described should serve to maintain the cable taut. As a safe-guard against binding of the cable, in the event of its becoming slack at any time and dropping from the sheaves $q'$, I provide upon each base plate $p'$, beyond the back plate $p^5$ and below the sheave, an inclined guard projection $p^6$ in the arc of the circle described by the lower edge of the sheave and close to said edge, upon which the cable will drop in the event of its leaving the sheave, and which will guide the cable to the sheave when the slack is taken up.

When the ore has been advanced by the stirrers around the roasting chamber it may be discharged through an opening Z in the hearth and into cars which move upon a track Z' below. As the stirrers pass from the roasting chamber the door $z'$ closes before the door $z^2$ opens and undue access of air is thus prevented.

In the roof of the roasting chamber adjacent to each fire-box is an opening $d$ closed by a removable lid. In the event of the accumulation of matte at a fire-box a bar may be inserted through the adjacent opening $d$ and the matte loosened. This is a very desirable feature particularly when lead ores are to be roasted. The openings are placed adjacent to the fire-boxes because those are the hottest parts of the roasting chamber and where the matte would form.

The construction of furnace shown is the preferred one for affording a longitudinally slotted wall by which the carrier for the stirrer arms is shielded from the direct action of the hot products of combustion; but it will be obvious that any construction which will bring the carrier outside the roasting chamber and afford a longitudinally slotted wall for the passage of the stirrer arm, and providing at the same time proper support for the portions of the furnace above the slot with proper provision for preventing undue ingress of cold air would be the mechanical equivalent of the construction shown and above described. Obviously also the number of reinforcing fire boxes employed may be governed by circumstances and the engine located in such position as may be found most convenient, for example, outside the furnace structure instead of inside as shown.

In order to guard against injury to the furnace by expansion and contraction under the wide variations of temperature to which it is subject, I prefer to construct it in sections which when the furnace is cool do not quite meet. When, however, the furnace is heated, producing slight elongation, the sections close nearly or quite together. Any crevices that exist at the junctions $w$ of the sections may be closed by means of fire clay or otherwise. The crevices in the hearth at the junction of sections may be closed by fire-brick $w'$ (Fig. 4) set loosely in the bed B' beneath the hearth.

What I claim as new, and desire to secure by Letters Patent, is—

1. In combination with a curved ore roasting furnace, a longitudinally slotted wall at the side of the roasting chamber, an endless cable mounted upon a series of guide-wheels located at intervals throughout the length of the furnace adjacent to the slotted wall, power mechanism for moving the cable, a traveling carrier adjacent to the cable, connecting means between the carrier and the cable, and an arm projecting from the carrier through the slot of the wall over the hearth and carrying stirrers, substantially as described.

2. In combination with a curved ore-roasting furnace, a longitudinally slotted wall at the side of the roasting chamber, an endless cable mounted upon a series of guide wheels located at intervals throughout the length of the furnace adjacent to the slotted wall, power mechanism for moving the cable, a traveling carrier adjacent to the cable, automatic mechanism upon the carrier for gripping and releasing the cable at predetermined points in the course of the carrier, and an arm projecting from the carrier through the slot of the wall over the hearth and carrying stirrers, substantially as described.

3. In an ore-roasting furnace, the combination with the roasting chamber, chambers $C'$ $C^2$ on opposite sides thereof, a heat generating fire box communicating therewith, and means for stirring and advancing the ore along the roasting chamber, comprising carriers running in the chambers $C'$ $C^2$, a stirrer arm mounted upon the carriers and extending across the roasting chambers, stirrer blades on the stirrer arm, and means for moving the carriers of an opening $d$ in the top of the roasting chamber adjacent to the generating fire box and provided with a door, substantially as and for the purpose set forth.

4. In combination with a curved ore-roasting furnace a longitudinally slotted wall at each side of the roasting chamber, an endless cable mounted upon a series of guide-wheels located at intervals throughout the length of the furnace adjacent to one of the slotted walls, power mechanism for moving the cable, a traveling carrier adjacent to the cable, connecting means between the carrier and cable, an arm projecting from the carrier through the slots in both walls, stirrers upon the arm, and a traveling support at the free end of the arm, substantially as described.

5. In combination with a curved ore-roasting furnace having an open portion between the terminals of the roasting chamber, and a longitudinally slotted wall at the side of the roasting chamber, an endless cable mounted upon guide-wheels located at intervals around the entire circuit of the structure, power mechanism for moving the cable, traveling carriers on a track extending throughout the whole circuit of the structure adjacent to the cable, an arm extending from the carrier through the slotted wall over the hearth and carrying stirrers, and automatic mechanism upon the carriers for gripping the cable at the entrance end of the roasting chamber, and releasing it at the exit end thereof, substantially as described.

6. In combination with a curved ore roasting furnace having an open portion between the terminals of the roasting chamber, and a longitudinally slotted wall at each side of the roasting chamber, a track adjacent to the outer side of each slotted wall and extending throughout the whole circuit of the structure including the open portion, traveling carriers upon one of the tracks, a stirrer arm extending from each carrier through both slotted walls and mounted at its free end upon a traveling support on the other track, an endless cable mounted upon guide-wheels located at intervals throughout the whole circuit of the structure, adjacent to the carrier track, power mechanism for moving the cable, and automatic means upon each carrier for gripping the cable at the entrance end of the roasting chamber and releasing it at the exit end thereof, substantially as described.

7. A curved ore roasting furnace having its masonry formed in sections which do not meet when the furnace is cool, substantially as and for the purpose set forth.

8. The combination with an ore-roasting furnace A having a slotted wall at the side of the roasting-chamber, an open portion between the terminals of the roasting-chamber and stops $y$ $y'$ at the open portion, an endless cable adjacent to the slotted wall, power mechanism for moving the cable, and traveling carriers having stirrer arms projecting into the roasting chamber through the slotted wall, of mechanism upon each carrier for gripping the cable at the entrance end of the roasting chamber and releasing it at the exit end thereof, comprising a stationary jaw, a rock-shaft provided with oppositely extending switch fingers to strike the stops on the furnace, a movable jaw and a link connection between the rock-shaft and movable jaw, substantially as described.

9. The combination with an ore-roasting furnace A having a slotted wall at the side of the roasting-chamber, open portion between the terminals of the roasting-chamber and stops $y$ $y'$ at the open portion, endless cable adjacent to the slotted wall, power mechanism for moving the cable and traveling carriers having stirrer arms projecting into the roasting chamber through the slotted wall, of mechanism upon each carrier for gripping the cable at the entrance end of the roasting chamber and releasing it at the exit end thereof, comprising jaws $h'$ $i'$, a switch finger connected with the jaws and operating by contact with the stop $y'$ to close the jaws, a switch finger connected with the jaws and operating by contact with the stop $y$ to open the jaws, and automatic locking mechanism for the jaws when closed arranged to be released by engagement with a stop just before the switch finger strikes the stop $y$, substantially as described.

10. The combination with the traveling carrier, of a stirrer arm comprising a bar $g$, fixed to the carrier, and a bar $f^2$, carrying a series of oblique stirrer blades, and clamping means for fastening the bar $f^2$ removably against the bar $g$, whereby the series of stirrer blades upon a stirrer arm may be simultaneously and quickly attached and detached, substantially as and for the purpose set forth.

11. The combination with the traveling carrier, of a stirrer arm comprising a bar $g$ fixed to the carrier, a shield secured around three sides of the said bar and separated therefrom by an air space, and a bar carrying stirrer-blades and detachably connected to the face of the bar $g$, substantially as described.

12. The combination with the traveling carrier, of a stirrer arm comprising a bar $g$ fixed to the carrier, a shield secured around three sides of the said bar and separated therefrom by an air-space, and a bar carrying stirrer blades detachably connected to the bar $g$, out of contact therewith, whereby an air-space intervenes between them, substantially as described.

13. The combination with the traveling carrier, of a stirrer arm comprising a bar $g$ fixed to the carrier, clips $g'$ upon the bar, a bar $f^2$ carrying stirrer blades and keys passing through the clips for detachably connecting the bar $f^2$ to the bar $g$, substantially as described.

14. In combination with an ore-roasting furnace having stirrers moving throughout the length of the hearth, a feed device for the ore arranged to be operated by the movement of the stirrers to discharge ore upon the hearth, substantially as described.

15. In combination with an ore-roasting furnace, intermittent feed mechanism for discharging ore upon the hearth comprising a counterbalanced upsetting platform, to receive the ore, a revoluble wheel having pockets receiving the ore from an ore supply and discharging it upon the platform, and means for stopping the wheel when the platform is upset by the weight of the ore deposited thereon, substantially as described.

16. In combination with an ore-roasting furnace, intermittent feed-mechanism for discharging ore upon the hearth, comprising an upsetting platform to receive the ore provided with an adjustable counterbalance, a revoluble wheel having pockets receiving the ore from an ore-supply and discharging it upon the platform, and means for stopping the wheel when the platform is upset by the weight of the ore deposited thereon, substantially as described.

HORACE F. BROWN.

In presence of—
M. J. FROST,
W. N. WILLIAMS.